(12) United States Patent  
Inada et al.

(10) Patent No.: US 6,369,739 B1  
(45) Date of Patent: Apr. 9, 2002

(54) AUTOMATIC GAIN CONTROL CIRCUIT

(75) Inventors: Yoshihiro Inada; Shinji Yamashita, both of Hyogo (JP)

(73) Assignees: Mitsubishi Denki Kabushiki Kaisha, Tokyo; Mitsubishi Electric System LSI Design, Hyogo, both of (JP)

( * ) Notice: Subject to any disclaimer, the term of this patent is extended or adjusted under 35 U.S.C. 154(b) by 0 days.

(21) Appl. No.: 09/427,005

(22) Filed: Oct. 26, 1999

(30) Foreign Application Priority Data

Apr. 30, 1999 (JP) .......................................... 11-124122

(51) Int. Cl.⁷ ................................................ H03M 1/12
(52) U.S. Cl. .......................................... 341/155; 330/98
(58) Field of Search ................................ 341/141, 155; 330/98, 129

(56) References Cited

U.S. PATENT DOCUMENTS 3,813,609 A * 5/1974 Wilkes et al. .................. 330/51
4,774,474 A * 9/1988 Beauducel et al. .......... 330/129
4,989,074 A * 1/1991 Matsumoto ................ 358/21 R
6,073,848 A * 6/2000 Giebel .................... 235/462.26

FOREIGN PATENT DOCUMENTS

| JP | 2-214319 | 8/1990 | ............ H03G/3/20 |
| JP | 3-243077 | 10/1991 | ............ H04N/5/52 |
| JP | 9-148860 | 6/1997 | ............ H03G/3/20 |

* cited by examiner

*Primary Examiner*—Peguy JeanPierre  
(74) *Attorney, Agent, or Firm*—McDermott, Will & Emery

(57) ABSTRACT

The AGC circuit is provided with an analog variable gain amplifying circuit which includes a plurality of fixed gain amplifiers and a selector for selecting one of the output signals of the plurality of fixed gain amplifiers, an A/D converter for receiving the selected output signal from the variable gain amplifying circuit, a digital band pass filter which allows only the burst signal and the color signal in the output signal from the A/D converter to pass through, and a digital AGC/detection circuit for controlling the gain of the variable gain amplifying circuit such that the burst signal remains stable and for amplifying the digital signal to obtain a digital output color signal such that the detected burst signal becomes equal in level to the digital reference signal. Thus, a more stable output signal can be obtained even with the variation in the ambient temperature or the power supply voltage.

7 Claims, 6 Drawing Sheets

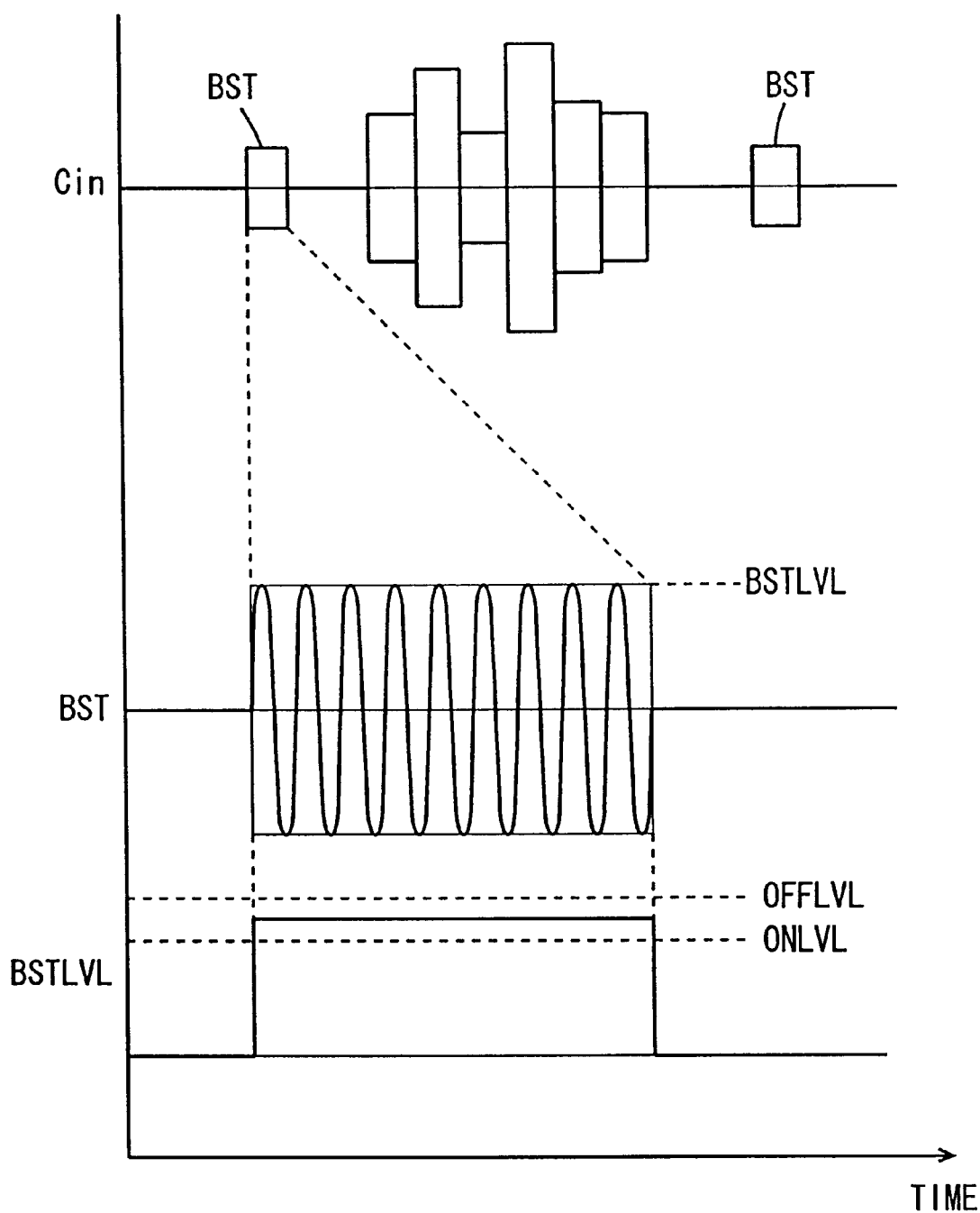
F I G. 4

DIGITAL AGC CHARACTERISTIC

AMPLIFIERS ON-SEQUENCE

AMPLIFIERS OFF-SEQUENCE

TOTAL AGC CHARACTERISTIC

AUTOMATIC GAIN CONTROL CIRCUIT

BACKGROUND OF THE INVENTION

1. Field of the Invention

The present invention relates to an automatic gain control (AGC) circuit, and more specifically, to an automatic color control (ACC) circuit in a color signal processing circuit.

2. Description of the Background Art

An AGC circuit automatically controls a gain of an amplifier such that the output remains stable while the input may vary. An analog AGC circuit generally is provided with an analog variable gain amplifier and an analog detector for detecting the output of the amplifier to control the gain of the amplifier. When the output level is higher than the reference level, the gain is reduced by the detector. On the other hand, when the output level is lower than the reference level, the gain is increased by the detector. Thus, a stable output is obtained at all times.

One of such AGC circuits is an ACC circuit. The ACC circuit is used in a color signal processing circuit which processes a color signal from a Y/C (luminance/color) separating circuit, and amplifies the color signal so that the amplitude of a burst signal included in the color signal remains stable at all times. An analog ACC circuit generally is provided with an analog variable gain amplifier for amplifying a color signal, and an analog detector for detecting a burst signal included in the amplified color signal to control the gain of the amplifier. When the level of the burst signal is lower than the reference level, the gain is increased by the detector, whereas when the level of the burst signal is higher than the reference level, the gain is reduced by the detector. Therefore, the amplifier amplifies the color signal such that the amplitude of the burst signal included in the amplified color signal remains stable at all times.

Since the performance characteristics of the variable gain amplifier and the detector in the above-described analog AGC circuit (including the ACC circuit) vary depending on the ambient temperature and the power supply voltage, there was the problem that the output of the AGC circuit varied accordingly.

SUMMARY OF THE INVENTION

An object of the present invention is to provide an automatic gain control circuit capable of providing a more stable output.

According to the present invention, an automatic gain control circuit for amplifying an analog input signal containing an input reference signal to supply a digital output signal is provided with an analog variable gain amplifying circuit, an analog-digital converter, and a digital AGC/detection circuit. The analog variable gain amplifying circuit receives the analog input signal. The analog-digital converter converts the analog signal output from the analog variable gain amplifying circuit into a digital signal. The digital AGC/detection circuit supplies to the analog variable gain amplifying circuit a control signal for controlling the gain of the analog variable gain amplifying circuit such that the level of an input reference signal in the digital signal output from the analog-digital converter remains stable, and amplifies the digital signal to obtain the digital output signal such that the input reference signal in the digital signal becomes equal in level to a prescribed digital reference signal.

Since the above-described AGC/detection circuit is formed by a digital circuit, the level of the input reference signal can be accurately detected even when the ambient temperature or the power supply voltage varies so that a more stable digital output signal is obtained. Moreover, because the digital AGC/detection circuit roughly performs an automatic gain control in advance by feeding back a control signal to the analog variable gain amplifying circuit, a broader range of the analog input signal which keeps the digital output signal stable is realized.

The above-described automatic gain control circuit, preferably, is further provided with a high-cut filter connected between an output of the analog variable gain amplifying circuit and an input of the digital AGC/detection circuit.

Thus, the high-frequency noise component contained in the output signal from the analog variable gain amplifying circuit is removed, and consequently, the level of the input reference signal is more accurately detected.

The above-described high-cut filter, more preferably, is connected between an output of the analog-digital converter and an input of the digital AGC/detection circuit.

Being formed by a digital circuit, the high-cut filter is not affected by the variation in the ambient temperature or in the power supply voltage, and is also capable of removing the clock noise from the analog-digital converter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a waveform chart showing an analog input color signal Cin, a burst signal BST, and the level BSTLVL of a detected burst signal shown in FIG. 1 or FIG. 3.

DESCRIPTION OF THE PREFERRED EMBODIMENT

Figure 1:
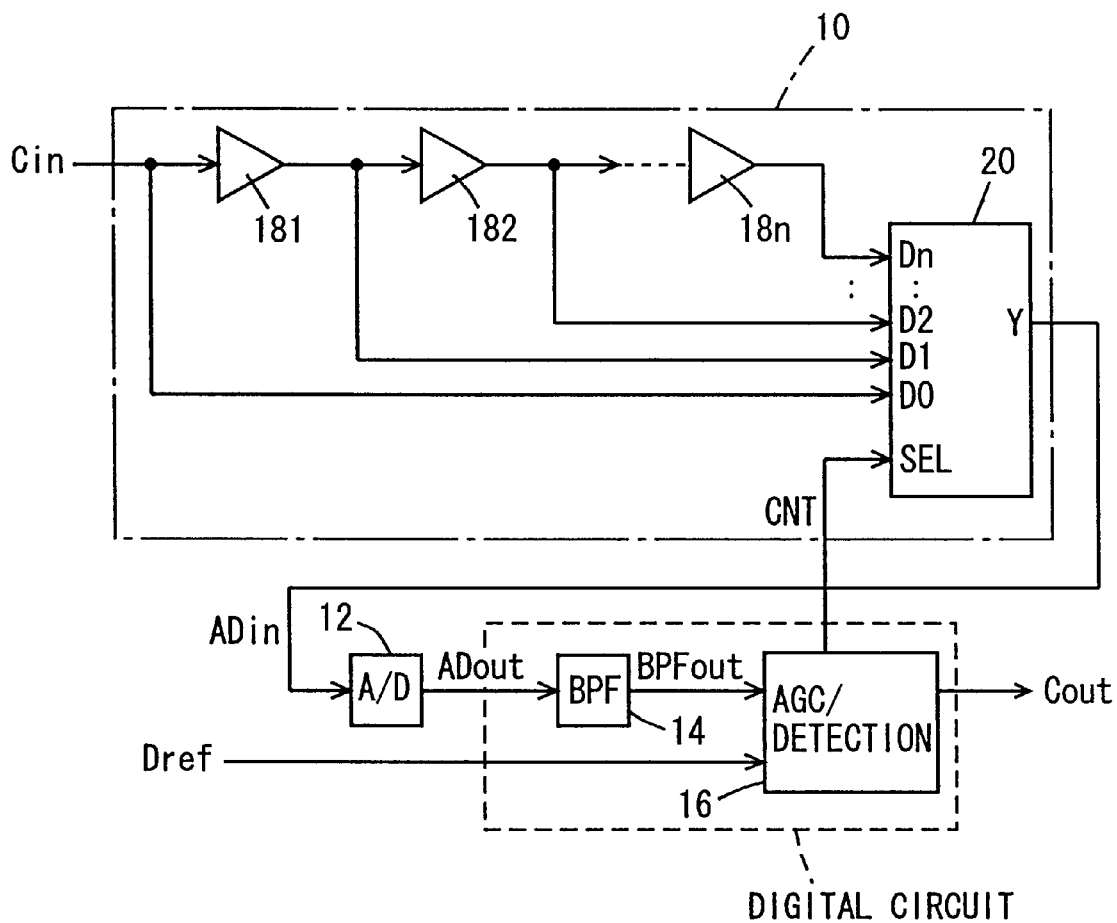
FIG. 1 is a block diagram illustrating an overall configuration of an ACC circuit according to an embodiment of the present invention.

An embodiment of the present invention will be described in detail below with reference to the drawings. The same or the corresponding parts throughout the drawings are designated by the same reference characters, and the description thereof will not be repeated.

As shown in FIG. 1, the ACC circuit according to an embodiment of the present invention includes an analog variable gain amplifying circuit 10, an analog-digital converter (A/D converter) 12, a digital band pass filter (BPF) 14, and a digital AGC/detection circuit 16, and amplifies an analog input color signal Cin containing a burst signal to supply a digital output color signal Cout.

Analog variable gain amplifying circuit 10 includes n fixed gain amplifiers 181 to 18n connected in series (n is an integer not smaller than 2), and a selector 20. Each of the amplifiers 181 to 18n has a constant gain m and amplifies each input signal by m. Analog input color signal Cin is provided to a data input terminal D0 of selector 20. Analog output signals m×Cin, $m^2$×Cin, . . . , $m^n$×Cin from amplifiers 181 to 18n are provided to data input terminals D1 to Dn of selector 20, respectively. A control signal CNT for controlling the gain of analog variable gain amplifying circuit 10 is provided to a selective control input terminal SEL of selector 20 from digital AGC/detection circuit 16. Selector 20 selects one of analog input color signal Cin and analog output signals from a plurality of fixed gain amplifiers 181 to 18n in response to control signal CNT, and outputs the selected signal as an analog input signal ADin to A/D converter 12 via an output terminal Y. Thus, analog variable gain amplifying circuit 10 receives analog input color signal Cin and amplifies color signal Cin by a variable gain of 1 to $m^n$.

A/D converter 12 converts analog input signal ADin output from analog variable gain amplifying circuit 10 into a digital output signal ADout.

Figure 2:
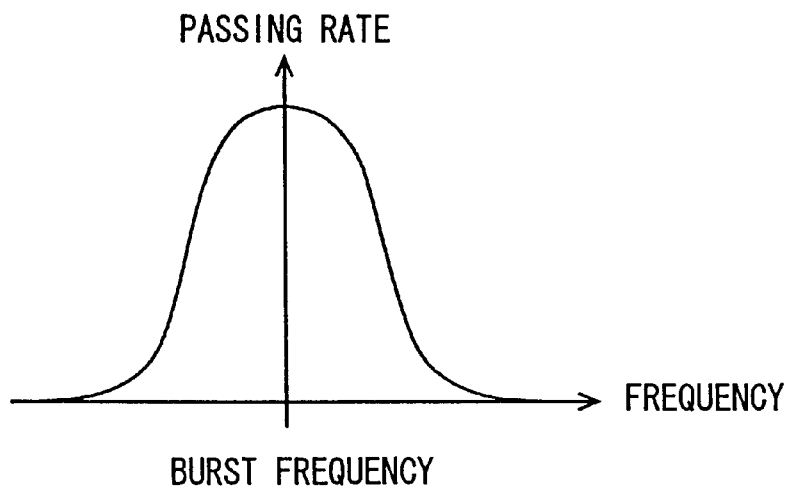
FIG. 2 is a diagram showing the frequency characteristic of a digital band pass filter shown in FIG. 1.

Digital band pass filter 14 is connected between an output of A/D converter 12 and an input of digital AGC/detection circuit 16, and has a frequency characteristic shown in FIG. 2. Thus, the central passing frequency of band pass filter 14 is set at the frequency of the burst signal (for example, at 3.58 MHz). Therefore, the burst signal and a color signal of a close frequency passes through band pass filter 14, while the high-frequency noise component and the low-frequency component are removed by band pass filter 14.

Figure 3:
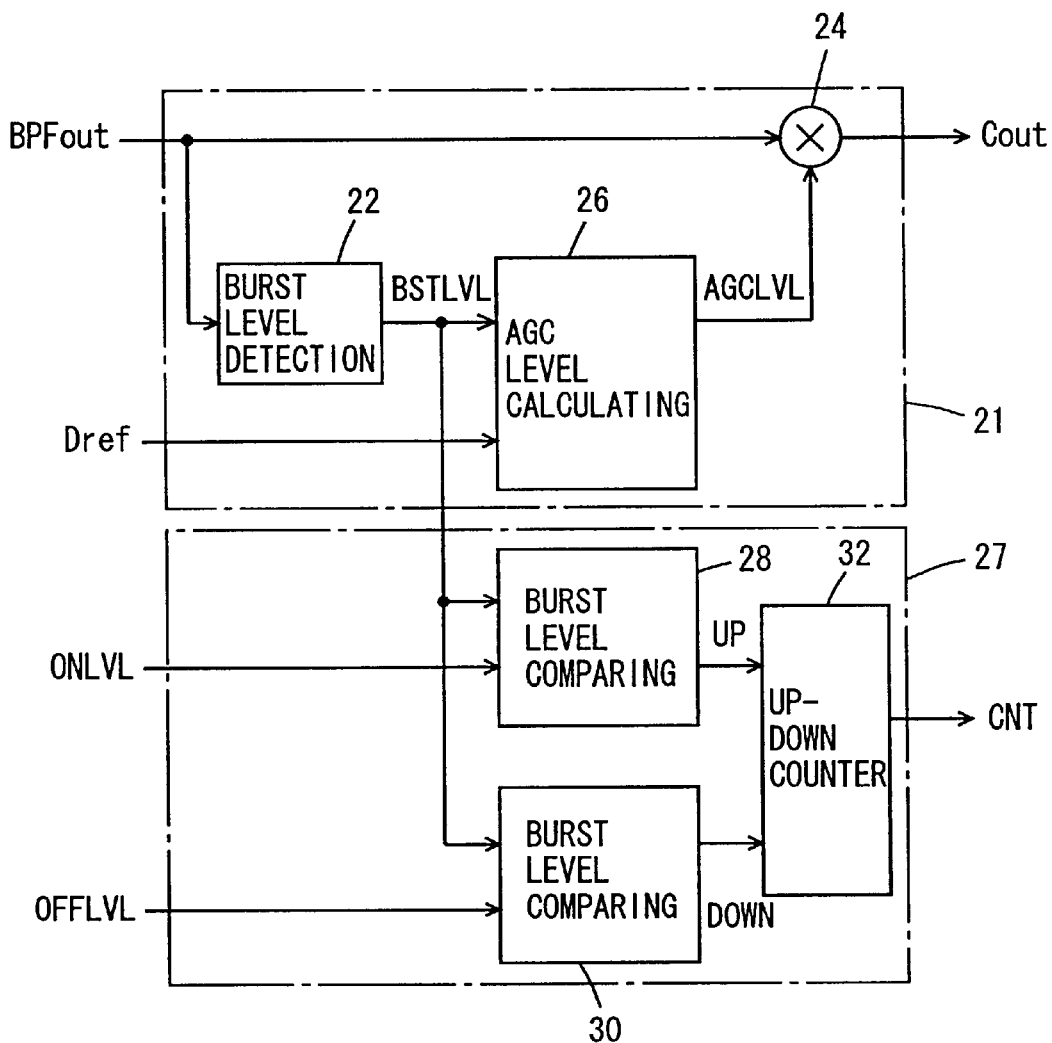
FIG. 3 is a block diagram illustrating a configuration of a digital AGC/detection circuit shown in FIG. 1.

As shown in FIG. 3, digital AGC/detection circuit 16 includes a digital AGC circuit 21 for amplifying a digital output signal BPFout to obtain a digital output color signal Cout such that the burst signal in digital output signal BPFout, which was output from A/D converter 12 and thereafter passed through band pass filter 14, becomes equal in level to a prescribed digital reference signal Dref; and a digital detection circuit 27 for supplying to analog variable gain amplifying circuit 10 control signal CNT for controlling the gain of analog variable gain amplifying circuit 10 so that the burst signal in digital output signal BPFout which was output from A/D converter 12 and thereafter passed through band pass filter 14 remains stable in level. Digital AGC circuit 21 includes a burst level detection circuit 22, a multiplier 24, and an AGC level calculating circuit 26. Digital detection circuit 27 includes burst level comparing circuits 28 and 30, and an up-down counter circuit 32.

In digital AGC circuit 21, burst level detection circuit 22 detects the level BSTLVL of a digital burst signal included in digital output signal BPFout from band pass filter 14. AGC level calculating circuit 26 calculates an AGC level AGCLVL according to level BSTLVL of the burst signal detected by burst level detection circuit 22. Multiplier 24 corrects for digital output signal BPFout from band pass filter 14 according to AGC level AGCLVL calculated by AGC level calculating circuit 26 to obtain a digital output color signal Cout. In other words, multiplier 24 multiplies digital output signal BPFout by AGC level AGCLVL, i.e., amplifies by a gain AGCLVL. AGC level calculating circuit 26 compares level BSTLVL of the burst signal detected by burst level detection circuit 22 with the level of prescribed digital reference signal Dref, sets the multiplicator (gain) of multiplier 24 to a small value when level BSTLVL of the detected burst signal is higher than the level of prescribed digital reference signal Dref, maintains the multiplicator (gain) of multiplier 24 when level BSTLVL of the detected burst signal is equal to the level of prescribed digital reference signal Dref, and sets the multiplicator (gain) of multiplier 24 to a large value when level BSTLVL of the detected burst signal is lower than the level of prescribed digital reference signal Dref. AGC level calculating circuit 26, preferably, sets the gain of multiplier 24 to a value smaller than "1" when level BSTLVL of the detected burst signal is higher than the level of prescribed digital reference signal Dref, sets the gain of multiplier 24 to "1" when level BSTLVL of the detected burst signal is equal to the level of prescribed digital reference signal Dref, and sets the gain of multiplier 24 to a value larger than "1" when level BSTLVL of the detected burst signal is lower than the level of prescribed digital reference signal Dref.

In addition, in digital detection circuit 27, burst level comparing circuit 28 compares the burst signal detected by burst level detection circuit 22 with a predetermined digital reference signal ONLVL, and generates an up signal UP when the detected burst signal is lower in level than digital reference signal ONLVL. Burst level comparing circuit 30 compares the burst signal detected by burst level detection circuit 22 with a predetermined digital reference signal OFFLVL which is higher in level than the above digital reference signal ONLVL, and generates a down signal DOWN when the detected burst signal is higher in level than digital reference signal OFFLVL. Up-down counter circuit 32 generates control signal CNT to be provided to the above-described selector 20 in response to up signal UP from burst level comparing circuit 28 and down signal DOWN from burst level comparing circuit 30. Up-down counter circuit 32 is incremented in response to up signal UP and is decremented in response to down signal DOWN. This count value is output as control signal CNT.

Now, the operation of the ACC circuit configured as described above will be explained below.

An analog input color signal Cin as the one shown in FIG. 4 is applied to analog variable gain amplifying circuit 10. Analog input color signal Cin contains a burst signal BST. Color signal Cin is applied to a data input terminal D0 of selector 20 as well as to the first stage of the cascaded fixed gain amplifiers 181 to 18n. An output signal m×Cin (m is gain) from first stage amplifier 181 is applied to a data input terminal D1 of selector 20. An output signal $m^2$×Cin from a second stage amplifier 182 is applied to a data input terminal D2. Similarly, an output signal $m^n$×Cin from the final stage amplifier 18n is applied to a data input terminal Dn. One of color signal Cin and output signals m×Cin, $m^2$×Cin, . . . , $m^n$×Cin is selected in response to control signal CNT and is output from an output terminal Y. Since up-down counter circuit 32 shown in FIG. 3 at first is being reset and control signal CNT=0, analog input color signal Cin applied to analog variable gain amplifying circuit 10 is output without being amplified. When up-down counter circuit 32 is incremented and control signal CNT=2, for instance, output signal $m^2$×Cin from amplifier 182 is selected and is output.

The output signal from selector 20 is applied as analog input signal ADin to A/D converter 12 where it is converted into digital output signal ADout.

Digital output signal ADout from A/D converter 12 is provided to band pass filter 14 where the high-frequency noise component is removed, and only the digital color signal component containing burst signal BST passes through band pass filter 14.

Digital output signal BPFout from band pass filter 14 is provided to digital AGC/detection circuit 16 where the AGC correction of the input color signal and the generation of control signal CNT are performed.

Figure 5:
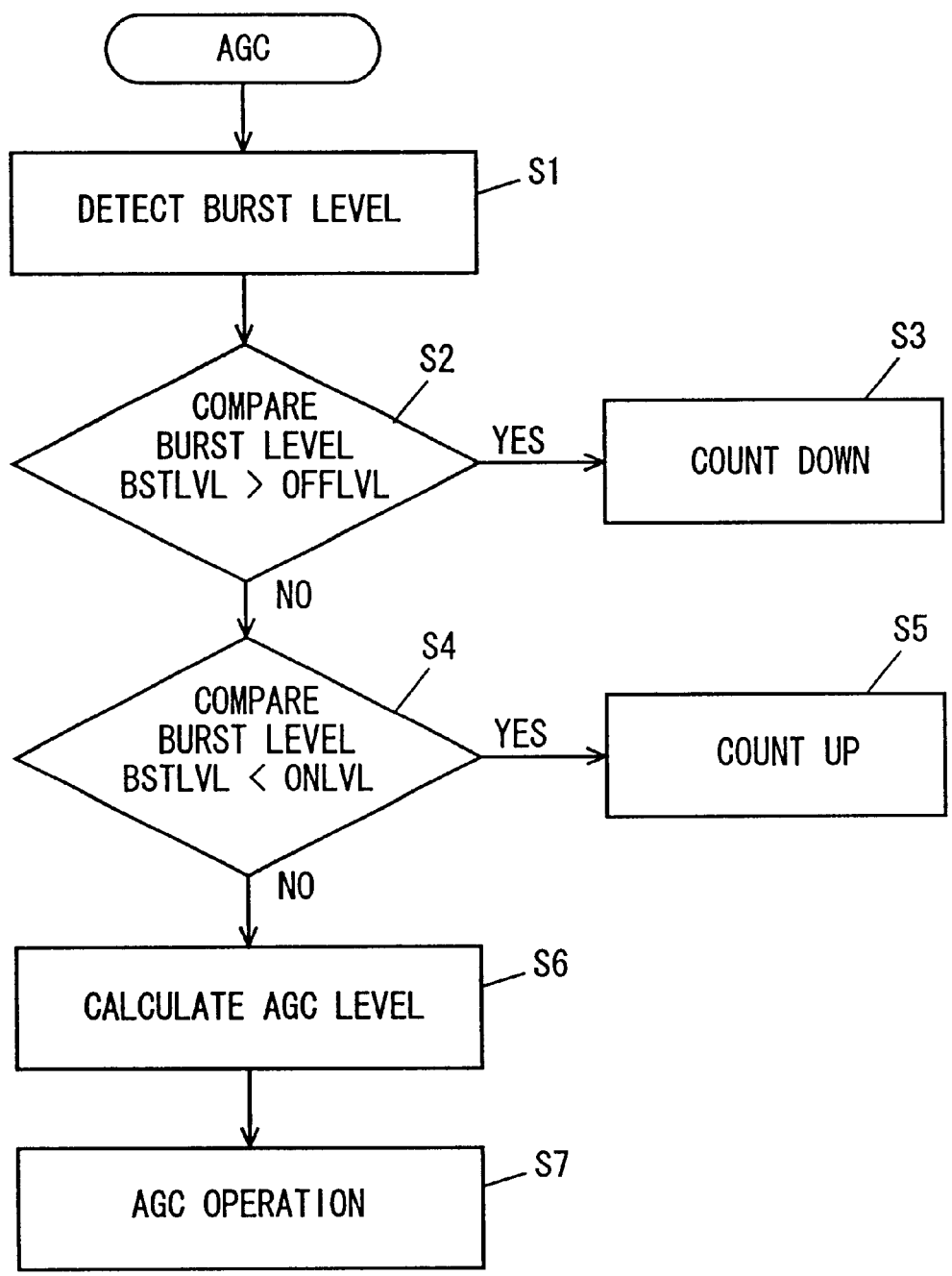
FIG. 5 is a flow chart illustrating an operation of the digital AGC/detection circuit shown in FIG. 3.

Digital output signal BPFout from band pass filter 14 is provided to multiplier 24 shown in FIG. 3 as well as to burst level detection circuit 22. In step S1 shown in FIG. 5, the level (half the amplitude) of burst signal BST included in digital output signal BPFout thus provided, or more specifically, an average peak level BSTLVL, is detected by burst level detection circuit 22.

Level BSTLVL of the detected burst signal is compared with a predetermined digital reference signal Dref in step S6, thereby AGC level AGCLVL is calculated. (Steps S2 to S5 will be described hereinafter.) More specifically, when level BSTLVL of the detected burst signal is higher than the level of reference signal Dref, a value of AGC level AGCLVL smaller than "1" is calculated according to the difference. When level BSTLVL of the detected burst signal is lower than the level of reference signal Dref, a value of AGC level AGCLVL larger than "1" is calculated according to the difference. When level BSTLVL of the detected burst signal is equal to the level of reference signal Dref, AGC level AGCLVL is set to "0."

The calculated AGC level AGCLVL is provided to multiplier 24, and the AGC operation is performed in step S7. More specifically, digital output signal BPFout from band pass filter 14 is multiplied by AGC level AGCLVL by multiplier 24. In other words, digital output signal BPFout is amplified by the gain of AGC level AGCLVL. Thus, a digital output color signal Cout is obtained.

Figure 6:
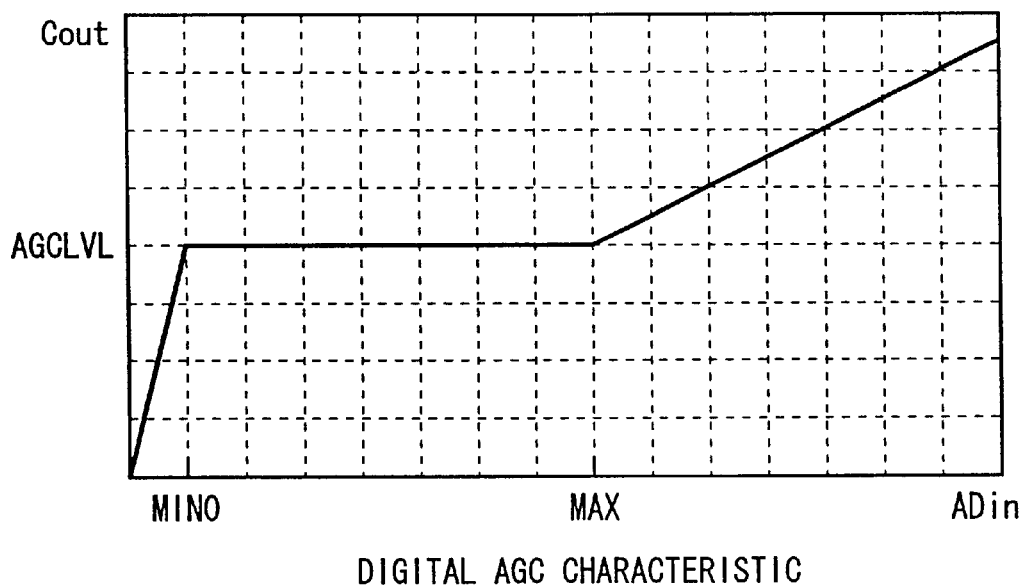
FIG. 6 is a diagram showing an AGC characteristic of the digital AGC circuit shown in FIG. 3.

As seen from the above description, digital AGC circuit 21 can produce output color signal Cout by amplifying input color signal Cin such that the level of burst signal BST remains stable even when the level of input color signal Cin varies. Therefore, digital AGC circuit 21 has an AGC characteristic as that shown in FIG. 6. In FIG. 6, the horizontal axis represents the level of a digital input signal ADin, while the vertical axis represents the level of digital output color signal Cout. As shown in FIG. 6, the level (AGCLVL) of digital output color signal Cout becomes stable when digital input signal ADin is in the range of the minimum level MIN0 to the maximum level MAX. When digital input signal ADin becomes lower in level than minimum level MIN0, however, the level of digital output color signal Cout does not become stable due to the limitation in the resolution of A/D converter 12. Thus, digital detection circuit 27 for performing the feedback control of analog variable gain amplifying circuit 10 is provided in order to lower the minimum level MIN0 to improve the AGC characteristic.

Level BSTLVL of the burst signal detected by burst level detection circuit 22 is provided to burst level comparing circuits 28 and 30 besides AGC level calculating circuit 26. Level BSTLVL of the burst signal provided to burst level comparing circuit 30 is compared with level OFFLVL of the digital reference signal in step S2 shown in FIG. 5. Down signal DOWN is generated when level BSTLVL of the burst signal is higher than level OFFLVL of the reference signal, and up-down counter circuit 32 counts down in response to down signal DOWN in step S3.

On the other hand, level BSTLVL of the burst signal provided to burst level comparing circuit 28 is compared with level ONLVL of the digital reference signal in step S4. Level ONLVL of the reference signal is set lower than the above-mentioned level OFFLVL of the reference signal. Up signal UP is generated when level BSTLVL of the burst signal is lower than level ONLVL of the reference signal, and up-down counter circuit 32 counts up in response to up signal UP in step S5.

The count value of up-down counter circuit 32 is fed back to analog variable gain amplifying circuit 10 as control signal CNT. The following Table 1 represents the correspondence between a control signal CNT and a data input terminal to be selected.

TABLE 1

| CNT | Selected Terminal |
|---|---|
| 0 | D0 |
| 1 | D1 |
| 3 | D2 |
| . | . |
| . | . |
| . | . |
| n | Dn |

As shown in Table 1, when control signal CNT=0, amplifiers 181 to 18n are all turned off, and analog input color signal Cin to be provided to data input terminal D0 is selected. When control signal CNT=1, first stage amplifier 181 is turned on, and analog output signal m×Cin from amplifier 181 to be provided to data input terminal D1 is selected. When control signal CNT=2, first and second stage amplifiers 181, 182 are turned on, and analog output signal $m^2 \times Cin$ from amplifier 182 to be provided to data input terminal D2 is selected. Similarly, when control signal CNT=n, all amplifiers 181 to 18n are turned on, and analog output signal $m^n \times Cin$ from amplifier 18n to be provided to data input terminal Dn is selected.

Figure 7:
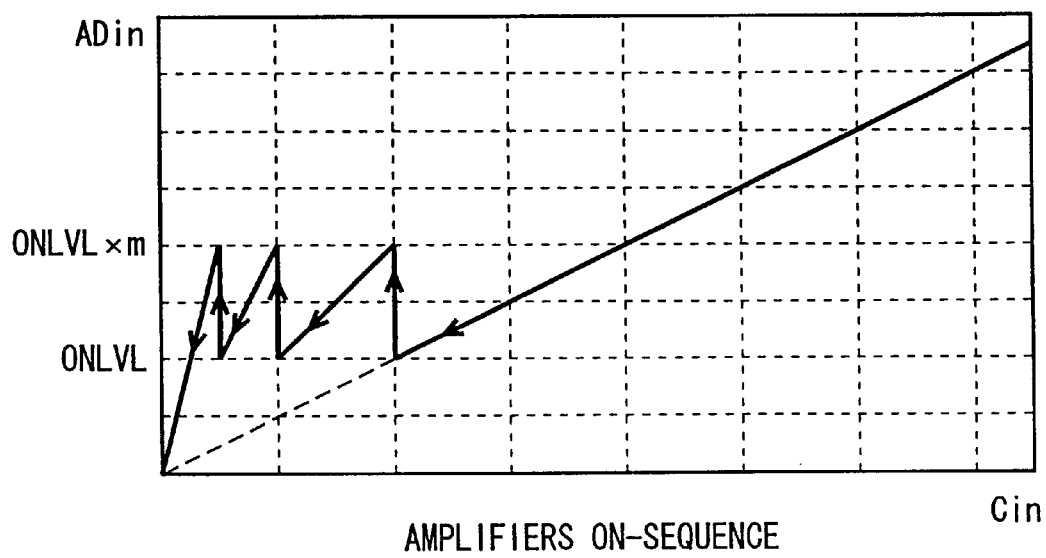
FIG. 7 is a diagram illustrating the sequence in which fixed gain amplifiers are successively turned on as a result of the feedback control by the digital AGC/detection circuit shown in FIG. 1.

FIG. 7 shows the sequence in which amplifiers 181 to 18n are successively turned on. In FIG. 7, the horizontal axis represents the level of digital input color signal Cin, while the vertical axis represents the level of analog input signal ADin provided from analog variable gain amplifying circuit 10 to A/D converter 12. When the level of digital input color signal Cin (or more strictly, of the detected burst signal BST) first falls to level ONLVL of the reference signal, amplifier 181 operates, and the level of analog input signal ADin shoots up to ONLVL×m. When the level of digital input color signal Cin falls to level ONLVL of the reference signal again, amplifier 182 operates, and the level of digital input signal ADin once again shoots up to ONLVL×m. Such operation is repeated as many times, i.e. n times, as the number of amplifiers, i.e. amplifiers 181 to 18n.

Figure 8:
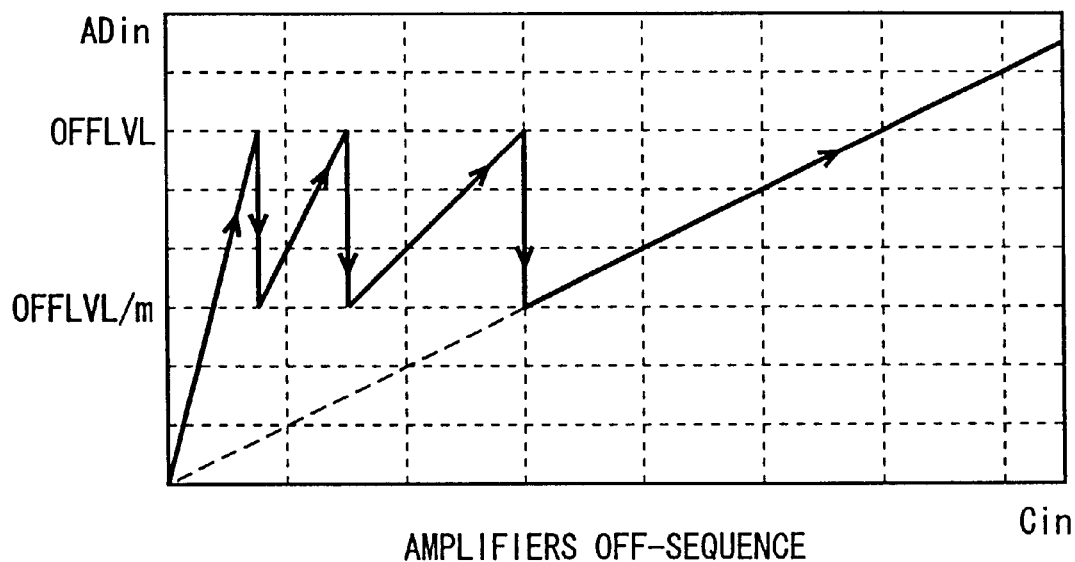
FIG. 8 is a diagram showing the sequence in which fixed gain amplifiers are successively turned off as a result of the feedback control by the digital AGC/detection circuit shown in FIG. 1.

FIG. 8 shows the sequence in which amplifiers 181 to 18n are successively turned off. In FIG. 8, the horizontal axis represents the level of digital input color signal Cin, while the vertical axis represents the level of analog input signal ADin as in FIG. 7. When the level of analog input color signal Cin first rises to level OFFLVL of the reference signal, amplifier 18n stops functioning, and the level of analog input signal ADin instantly drops to OFFLVL/m. When the level of digital input color signal Cin rises to level OFFLVL of the reference signal again, the amplifier (not shown) one stage below amplifier 18n also stops functioning, and the level of analog input signal ADin once again drops instantly to OFFLVL/m. Such operation is repeated as many times, i.e. n times, as the number of amplifiers, i.e. amplifiers 181 to 18n.

Figure 9:
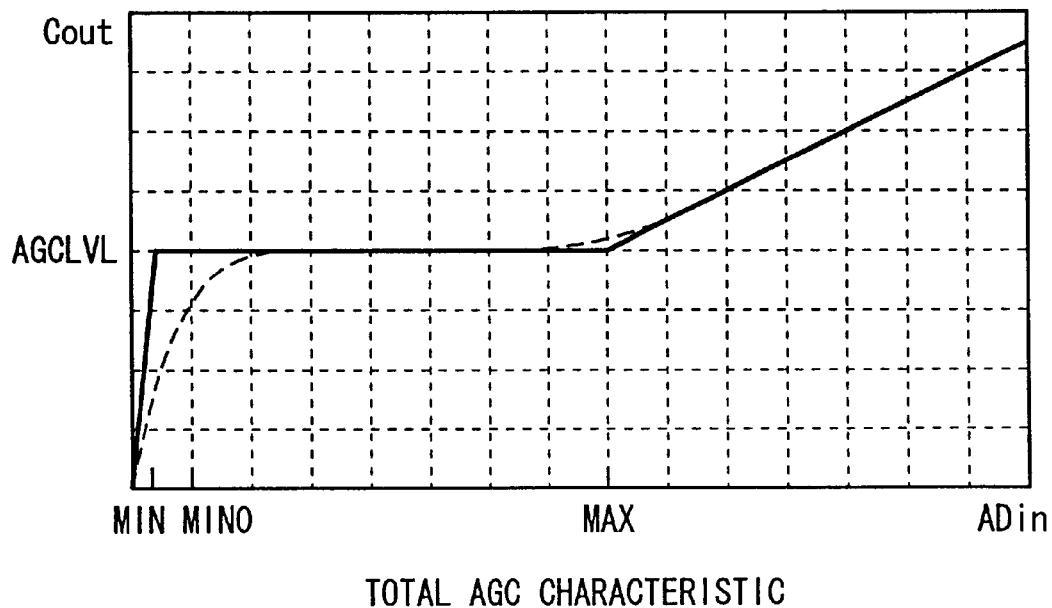
FIG. 9 is a diagram showing an AGC characteristic of the entire ACC circuit shown in FIG. 1.

According to the above-described ACC circuit, the total AGC characteristic as shown by the solid line in FIG. 9 is realized. In FIG. 9, the horizontal axis represents the level of analog input signal ADin, while the vertical axis represents the level of digital output signal Cout. Moreover, the solid line shows the total AGC characteristic of the above-described ACC circuit, and the broken line shows the total AGC characteristic of a conventional analog ACC circuit. As shown in FIG. 9, the range of input signal ADin which allows a stable output color signal Cout to be obtained is wider than that of the conventional analog ACC circuit, and is even wider than that of digital AGC circuit 21 shown in FIG. 6. More specifically, the minimum level MIN of the ACC circuit according to this embodiment is lower than the minimum level MIN0 of digital AGC circuit 21.

As described above, according to the present embodiment, AGC/detection circuit 16 which feedback controls analog variable gain amplifying circuit 10 is formed by a digital circuit so that the level of the burst signal is accurately detected even when the ambient temperature or the power supply voltage varies. As a result, a more stable output color signal Cout is obtained.

In addition, since a general analog automatic gain control is performed by variable gain amplifying circuit 10 before the digital automatic gain control by AGC/detection circuit 16, the minimum level of input signal ADin which keeps output color signal Cout stable in level is lowered, resulting in a broader AGC characteristic.

Moreover, variable gain amplifying circuit 10 is formed by at least two fixed gain amplifiers 181 to 18n so that the circuit configuration is simplified.

Furthermore, since band pass filter 14 is formed by a digital circuit and is inserted downstream of A/D converter 12, burst signal BST is accurately detected even with the variation in the ambient temperature or the power supply voltage, and the clock noise from A/D converter 12 is also removed.

Although the above-described embodiment employs variable gain amplifying circuit 10 formed by two or more fixed gain amplifiers 181 to 18n, a usual analog variable gain amplifier capable of changing the gain continuously may be employed instead.

Further, although band pass filter 14 is formed by a digital circuit and is connected between an output of A/D converter 12 and an input of AGC/detection circuit 16, alternatively, the band pass filter may be formed by an analog circuit, and may be connected between an output of analog variable gain amplifying circuit 10 and an input of A/D converter 12.

The above-described embodiment is directed toward an ACC circuit for amplifying a color signal such that the burst signal included in the color signal remains stable. The present invention, however, is applicable to a variety of AGC circuits which amplify an input signal containing a specific reference signal to produce an output signal such that the reference signal remains stable, as in the case of an AGC circuit for amplifying a luminance signal such that the reference signal included in the luminance signal remains stable.

In addition, when a luminance signal is input instead of a color signal, a low pass filter is employed instead of band pass filter 14. In short, a filter of this kind should be capable of functioning so as to cut off the high-frequency component contained in an output signal from analog variable gain amplifying circuit 10.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic gain control circuit for amplifying an analog input signal containing an input reference signal to supply a digital output signal, comprising:
   an analog variable gain amplifying circuit receiving said analog input signal;
   an analog-digital converter converting an analog signal output from said analog variable gain amplifying circuit into a digital signal; and
   a digital AGC/detection circuit supplying to said analog variable gain amplifying circuit a control signal for controlling a gain of said analog variable gain amplifying circuit such that level of the input reference signal in the digital signal output from said analog-digital converter becomes constant and amplifying said digital signal to obtain said digital output signal such that the input reference signal in said digital signal becomes equal in level to a prescribed digital reference signal;
   said analog variable gain amplifying circuit including:
      a plurality of fixed gain amplifiers connected in series, and
      a selector selecting one of analog output signals from said plurality of fixed gain amplifiers in response to said control signal.

2. The automatic gain control circuit according to claim 1, wherein said selector selects one of said analog input signal and the analog output signals from said plurality of fixed gain amplifiers.

3. The automatic gain control circuit according to claim 1, further comprising a high-cut filter connected between an output of said analog variable gain amplifying circuit and an input of said digital AGC/detection circuit.

4. The automatic gain control circuit according to claim 3, wherein said high-cut filter is connected between an output of said analog-digital converter and an input of said digital AGC/detection circuit.

5. The automatic gain control circuit according to claim 1, wherein said digital AGC/detection circuit includes:
   a reference signal detection circuit detecting the input reference signal in the digital signal output from said analog-digital converter,
   a multiplier multiplying the digital signal output from said analog-digital converter, and
   a multiplier control circuit comparing the input reference signal detected by said reference signal detection circuit with said prescribed digital reference signal to set a multiplier number of said multiplier to a small value when said input reference signal detected is higher in level than said prescribed digital reference signal and to set the multiplier number of said multiplier to a large value when said input reference signal detected is lower in level than said prescribed digital reference signal.

6. The automatic gain control circuit according to claim 5, wherein said digital AGC/detection circuit further includes
   a first comparing circuit comparing the input reference signal detected by said reference signal detection circuit with a first prescribed digital reference signal to generate an up signal when said input reference signal detected is lower in level than said first prescribed digital reference signal,
   a second comparing circuit comparing the input reference signal detected by said reference signal detection circuit with a second prescribed digital reference signal higher in level than said first prescribed digital reference signal to generate a down signal when said input reference signal detected is higher in level than said second prescribed digital reference signal, and
   an up-down counter circuit generating said control signal in response to said up and down signals.

7. The automatic gain control circuit according to claim 1, wherein said input reference signal is a burst signal and said analog input signal is a color signal.

* * * * *

UNITED STATES PATENT AND TRADEMARK OFFICE
CERTIFICATE OF CORRECTION

PATENT NO.     : 6,369,739 B1
DATED          : April 9, 2002
INVENTOR(S)    : Yoshihiro Inada et al.

It is certified that error appears in the above-identified patent and that said Letters Patent is hereby corrected as shown below:

<u>Title page,</u>
Item [73], Assignees, change the name of the second Assignee from "Mitsubishi Electric System LSI Design" to -- Mitsubishi Electric System LSI Design Corporation --.

Signed and Sealed this

Twenty-second Day of October, 2002

*Attest:*

JAMES E. ROGAN
*Attesting Officer*   *Director of the United States Patent and Trademark Office*